United States Patent
Kimijima

(10) Patent No.: US 6,173,892 B1
(45) Date of Patent: Jan. 16, 2001

(54) RUBBER PRODUCT CONTROL METHOD USING IDENTIFICATION MARKING

(75) Inventor: Takao Kimijima, Tokyo (JP)

(73) Assignee: Bridgestone Corporation, Tokyo (JP)

(*) Notice: Under 35 U.S.C. 154(b), the term of this patent shall be extended for 0 days.

(21) Appl. No.: 09/069,281

(22) Filed: Apr. 29, 1998

(30) Foreign Application Priority Data

May 2, 1997 (JP) ................................................ 9-114679

(51) Int. Cl.$^7$ ................................................ G06F 17/60
(52) U.S. Cl. ................ 235/385; 235/487; 235/445; 235/462.01
(58) Field of Search ................ 235/487, 448, 235/462.01, 385

(56) References Cited

U.S. PATENT DOCUMENTS

| | | | |
|---|---|---|---|
| 3,781,798 | * 12/1973 | Hinks | 340/146.3 |
| 4,093,694 | * 6/1978 | Browning | 264/246 |
| 4,687,942 | * 8/1987 | Takagi et al. | 250/556 |
| 4,827,395 | * 5/1989 | Anders et al. | 364/138 |
| 4,911,217 | * 3/1990 | Dunn et al. | 152/152.1 |
| 4,929,820 | * 5/1990 | Jspersen | 235/487 |
| 5,320,874 | * 6/1994 | Kansupada et al. | 427/393.5 |
| 5,527,407 | * 6/1996 | Gartland et al. | 156/64 |
| 5,700,623 | * 12/1997 | Anderson et al. | 430/256 |
| 5,833,788 | * 11/1998 | Mahn, Jr et al. | 156/209 |
| 5,996,892 | * 12/1999 | Meadows | 235/462.01 |

FOREIGN PATENT DOCUMENTS 61-27711 2/1986 (JP).
5-90539 12/1993 (JP).

* cited by examiner

Primary Examiner—Thien M. Le
Assistant Examiner—Daniel S Felten
(74) Attorney, Agent, or Firm—Sughrue, Mion, Zinn, Macpeak & Seas, PLLC

(57) ABSTRACT

By linking together a first set of identification information and a second set of identification information, and by creating a database linking together manufacturing information, sales information, and distribution information with the first identification information as a keyword, the burden on the user of controlling manufacturing can be lightened by, for example, the manufacturing information side informing the sales information side that the product renewal date is approaching. Further, a response can rapidly be made to demands from the user, and steps rapidly taken (i.e. transmitted to the manufacturing process and put into practice) to meet those demands.

19 Claims, 1 Drawing Sheet

RUBBER PRODUCT CONTROL METHOD USING IDENTIFICATION MARKING

BACKGROUND OF THE INVENTION

1. Field of the Invention

The present invention relates to a method for controlling rubber products using identification marking, in order to control rubber products molded using a variety of materials, including a plurality of rubber materials such as tires, tubes, belts, hoses, anti-vibration rubber, rubber crawlers, and the like.

2. Description of the Related Art

It is well known that in the manufacturing process for forming rubber products, in particular tires, there are a plurality of processes such as the molding process, the vulcanization process, the visual inspection process, the size selection process, the balance inspection process, and the like, and that there are many types of rubber materials and other materials used. If the effects of a defective material extend to the later processes, then other non-defective materials are wasted, and later processes become extremely complicated, even if the defective material is discovered in the final inspection.

Therefore, it is optimal to discover defective products in the earliest stages by providing an inspection process at the completion of each process. If necessary, it is possible to know the record of the content of the inspection and the results for each process by maintaining a so-called chart for each tire for a certain period.

On the other hand, it is proposed to control the process by applying labels with bar-codes thereon to tires before vulcanization, and integrating the labels into the tires by vulcanization, and by reading this bar-code during the selection of tire size in the inspection process after vulcanization. (For example, refer to Japanese Patent Application Laid-Open (JP-A) No. 61-27711, Japanese Utility Model Application Laid-Open (JP-U) No. 5-90539).

Product control using identification marking by bar-code and the like, as described above, can easily be employed throughout the entire manufacturing process.

On the other hand, after manufactured tires are shipped, they are normally controlled in lots, however, in the case of airplane tires (hereinafter called AP tires), they are controlled individually and are returned to the manufacturer when their period of use has expired. The returned tires are recapped by having their treads replaced and, in some cases, are shipped again as recapped tires. Because of this, in the case of AP tires, it is necessary to maintain a record of the early stages of a manufactured tire.

However, there is no control system, which directly links the record of a tire in the manufacturing stage with the record of the tire after shipping, thus there is the problem that it is difficult, for example, to respond to information or demands from customers adequately and rapidly.

SUMMARY OF THE INVENTION

In consideration of the above facts, it is an object of the present invention to provide a rubber products control method whereby defective materials can be prevented from proceeding to the latter processes of a manufacturing process, and where information or demands from customers can be fed back adequately and rapidly to the manufacturing process, by implementing a control system directly linking the history of a product in the manufacturing stage and the history of the product after shipping, through identification marking.

In the first aspect of the present invention, rubber products are controlled using identification marking by: manufacturing rubber products using a variety of materials including a plurality of rubber materials, shipping said rubber products with a first identification marking given thereto, and controlling manufacturing information, sales information, and distribution information at the point of manufacture based on said first identification marking.

According to the first aspect, manufacturing information, sales information, and distribution information, which hitherto were controlled separately at the manufacturing stage and the post shipping stage, can be integrated and controlled based on identification markings given to the rubber products. For example, if it were necessary to obtain the manufacturing information of a rubber product from the distribution information, this could be investigated rapidly based on the first identification marking.

Thus, by having a control system which directly links the record in the manufacturing stage (manufacturing information) and the record after shipping (shipping information, distribution information), it is possible, for example, to enable the information or demands from customers to influence the manufacturing process, and a rapid, adequate response to be made.

Namely, the first aspect implements a control system which directly links the record of a product in the manufacturing stage and the record thereof after shipping, and allows demand and the like from customers to be fed back adequately and rapidly to the manufacturing process.

In the second aspect, rubber products are controlled using identification marking, according to the first aspect, by a method wherein the first identification marking is given during the molding process. The rubber products are controlled by using the first identification marking, and by using the inspection results recorded from a manufacturing process prior to a particular manufacturing process from molding to shipping inspection, and including vulcanization and size selection.

According to the second aspect, by using the first identification making to control the manufacturing processes, it is possible to establish a control system which directly links the record of the manufacturing stages during and after the molding process (manufacturing information) and the record after shipping (shipping information and distribution information).

In the third aspect, rubber products are controlled using identification marking, according to the second aspect, by a method wherein a second identification marking is given to each of the rubber materials constituting the rubber product during a manufacturing process prior to molding, and the products are controlled by relating the first identification marking to the second identification marking.

According to the third aspect, it is possible to have a control system which directly links the history of the materials used at a stage before the molding process, and the history at a manufacturing stage after the molding process.

Namely, according to the second and third aspects, it is possible to prevent defective materials from affecting later processes.

In the fourth aspect, rubber products are controlled using identification marking, according to one of the first to third aspects by: forming renewable rubber products by replacing a portion of the rubber material of returned rubber products, the record of said rubber products is understood from the first identification marking given to the returned rubber products at the time of renewing said rubber products, and indicating a renewal process program with optimal conditions to the manufacturing process based on the understood record, the renewed rubber product is shipped with a third identification marking given, and the manufacturing information, sales information, and distribution information are controlled at the point of manufacture according to the first and third identification markings.

According to the fourth aspect, in cases where a shipped rubber product is returned and a portion of the rubber material replaced, as in the first aspect, by directly linking the record during the manufacturing stages (manufacturing information) and the record after shipping (shipping information, distribution information), the record of the rubber product based on the first identification marking given to the returned rubber product can be understood during the renewal of the rubber product, and a renewal process program with optimal conditions can be indicated to the manufacturing process.

Namely, in the fourth aspect, it is possible to indicate a renewal process program with optimal conditions to the manufacturing process by understanding the record of a rubber product, during the renewal of the rubber product, according to a first identification marking given to the returned rubber product. Further, by relating the first identification marking to the third identification marking given to the renewed product, a control system can be established linking the manufacturing stage record (manufacturing information) and the record after shipping (shipping information, distribution information) of the previous product with the manufacturing and shipping records of the renewed product.

DESCRIPTION OF THE PREFERRED EMBODIMENTS

Figure 1:
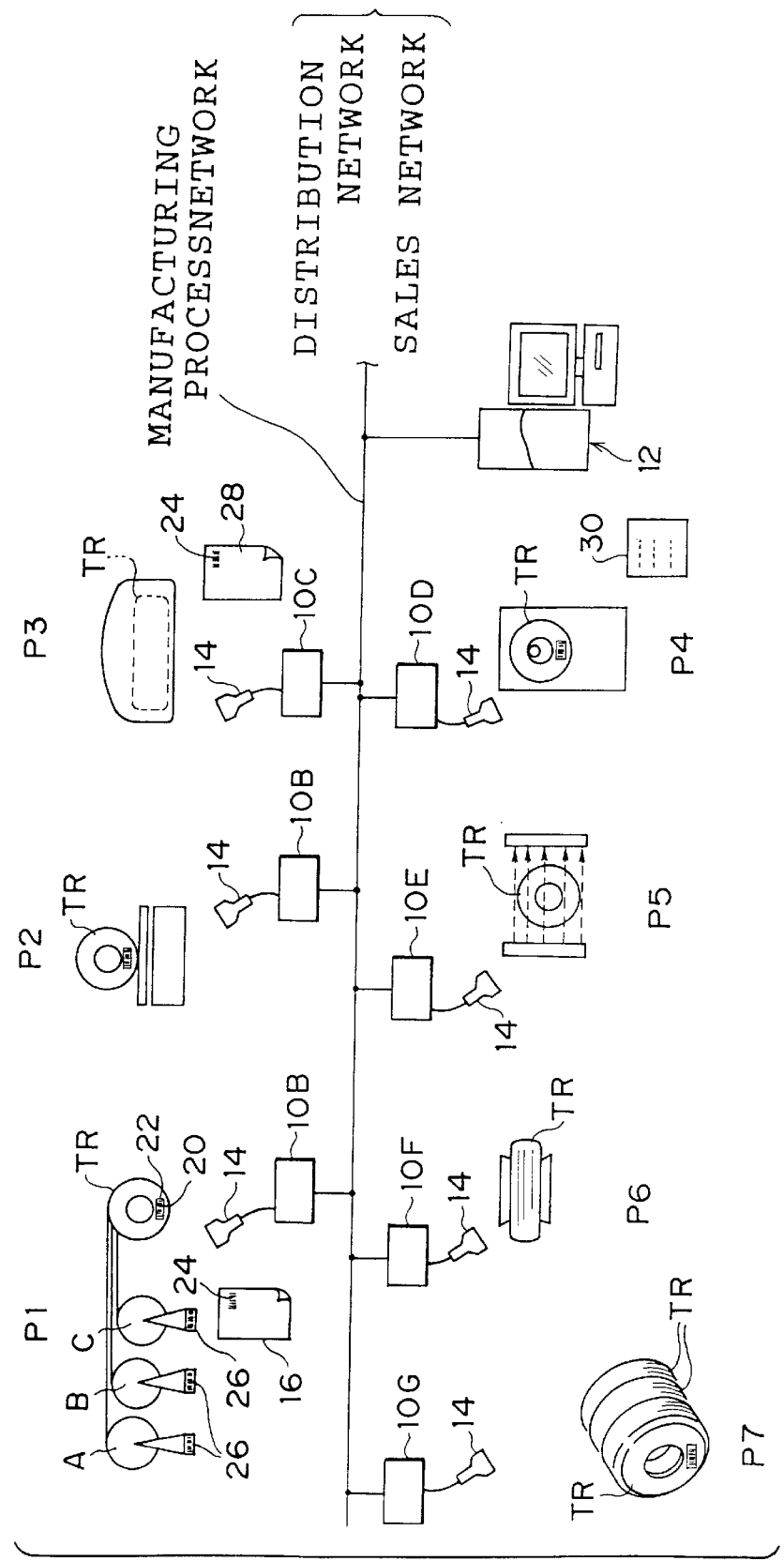
FIG. 1 is a process diagram showing the process of manufacturing AP tires in accordance with the preferred embodiment.

Tires as rubber products can be classified into passenger car tires, truck and bus tires (called TB tires), and airplane tires (called AP tires).

AP tires will be used as an example. Under the system established for AP tires, when a tire has reached the end of its life span under normal conditions, the tire is returned to the manufacturer, its tread is replaced and the tire is shipped again as a recapped tire. Further, in the case of passenger car and TB tires, recapped tires exist, but they are plainly stated to be recapped tires and treated as having absolutely no relation with the original products.

As shown in FIG. 1, the processes for manufacturing tires are provided in the following order. After the preparation process, in which the plurality of materials from which tires are formed are prepared, comes the molding process P1, the raw tire inspection process P2, the vulcanization process P3, the visual inspection process P4, the size selection process P5, the balance inspection process P6, and the shipping inspection process P7. Between each process a judgment on accepting or rejecting the product is made before the product is sent to the next process.

The following is an example of this judgment of acceptance or rejection. In the inspection after the molding process P1, a label 22, having been given the first bar code (identification marking) 20, is applied to the tire TR, and the fact that the tire has passed the molding process inspection is recorded on the bar code. The tire then proceeds to the next process, being the raw tire inspection process P2.

In the raw tire inspection process P2, firstly the record of the previous process, (namely the molding process in this case), is understood by reading the first bar code. The results of the inspection process of the tire in the raw state are then recorded and the tire is sent to the next process (vulcanization process P3).

In this manner, by recording the information from the current process, and forwarding it to the next process, while understanding the information as far as the previous process, in the shipping process, which is the final process, the information from all processes can be understood, and shipped in a controlled state using the first bar code 20.

The outline of the operations using a bar code in each process will now be explained.

As shown in FIG. 1, the terminal units for each process 10A to 10G are connected with the host computer 12, and they can exchange information with the host computer 12 at any time. A bar code reader 14 is connected with the terminal units 10A to 10G.

(Operations in the molding process P1)

The bar code reader 14 of the terminal 10A reads the bar code 24 provided on the process table 16. By this, the members to be used for the size of tire TR to be created are entered in the terminal 10A.

Next, the second bar code 26 (the second identification marking) affixed to the supply vehicle of each of the members prepared in the previous process is read, and the members stored in memory after being compared with the list of members to be used obtained from the process chart 16. After that, the members to be used are assembled and the tire TR is molded. The operations of the molding process P1 are completed when the bar code label 22, with the first bar code 20 having already been related to the bar code 24 from the process table 16 recorded thereon, is affixed to the tire TR. At this stage, by relating the second bar code 26 to the first bar code 20, the record before the molding process can be linked with the record after the molding process.

(Operations in the raw tire inspection process P2)

In this process, after the first bar code 20 affixed to the tire TR is read, measurements are taken and a mold releasing liquid is applied at a rate of once every few tires. The measurements are then recorded in the terminal 10B. This recording can either be keyed-in (input by an operator by hand), or else input automatically.

At this stage, if there is no variation between the measurement results and the prescribed figures (the predetermined range), then the product is adjudged to have passed at this stage. If there is a variation, then it is anticipated that there was a variation in the members and the product is adjudged to be defective. Both outcomes are recorded. Products which are judged to be defective are returned to a previous process stage, repaired, and then inspected again. However, at this time it can be understood that the tire had previously had a defect by reading the first bar code 20.

(Operations in the vulcanization process P3)

In the vulcanization process P3, a vulcanization process table 28 is provided. The second bar code 24 (identical to the process chart of the molding process) provided in the vulcanization process table 28 is read, and the first bar code 20 provided on tire TR is also read, and the two are compared. If the two correspond as a result of the comparison, the tires are placed into a kiln and the vulcanization process is carried out. By this vulcanization, the first bar code affixed to the tire TR is integrated with the tire TR and control becomes possible even after shipping.

(Operations in the visual inspection process P4)

Firstly, the first bar code 20 from the bar code label 22 integrated with the tire TR is read, and a visual inspection is carried out based on the visual inspection table 30. The selection of whether or not the product has passed or requires repairs is recorded in the terminal 10D based on the visual inspection chart 30. A judgment is also made as to whether or not it is the tires first firing. If the tire is judged to have been fired once, the settings of the kiln can be reliably determined. Further, by recording factors and sectors other than whether or not the inspection has been passed, the data can be analyzed and information on how to improve the process fed back to the manufacturing process.

(Operations in the size selection process P5, the balance inspection process P6, and the shipping inspection process P7)

In the size selection process P5, the balance inspection process P6, and the shipping inspection process P7, the first bar code 20 provided on each tire TR is read, and size selection, balance inspection of the tires TR, and a shipping inspection are carried out. Products which are judged to have failed the inspection are returned to a specific process after the reason for the failure has been recorded.

In this manner, by undertaking each process while ensuring the second bar code 26 prepared for each material and the first bar code 20 affixed to the tire TR correspond with the second bar code 24 provided on the process tables 16 and 28 during the manufacturing stages, a database can be created using the first bar code 20 affixed to the tire TR as the keyword, while linking together the information from the molding process P1 through to the shipping process P7.

Moreover, the first bar code given to a tire TR is utilized after shipping, and can be utilized as the common keyword in the sales information database and the distribution information database. Therefore, manufacturing information, sales information, and distribution information can be linked and controlled as a single package.

Further, all information is recorded as a database in the host computer 12, so the so called charts can be abolished and the number of documents decreased.

Furthermore, as is the case with AP tires, when the tires are returned to the manufacturer for recapping after their predetermined period of use has expired, the record from the initial manufacturing stages can be rapidly retrieved by simply reading the first bar code given to the tire, and the manufacturing process operators can be made aware of any relevant information (for example, that the tire had been judged defective during the manufacturing stage, and the like).

In the process for manufacturing recapped tires, there are inspection processes, a buffing process, a molding process, a vulcanization process (adherence process), and a shipping process. These processes are somewhat different from the processes for manufacturing a new tire. However, in the molding process of a tire that has been returned, after the tire is fitted with a new tread (the first bar code 20 is disposed of together with the old tread), a new third bar code may be given, and the information from each manufacturing process may be recorded in the same way as in the manufacture of a new tire. In this case, it is, of course, preferable to keep the record of the first bar code 20. Further, if other manufacturers products are returned as recapped tires, then a new first bar code 20 may be given.

In this way, during the manufacturing process, by linking the first bar code 20 and the second bar code 26 to bar code 24, and by creating a database linking the manufacturing information, the sales information, and the distribution information, with the first bar code 20 as the keyword, for example, the manufacturing information side (the manufacturer) can inform the sales information side (the seller and later dealers) that the recapping date is approaching, and the burden on the user of controlling the products can be decreased.

Further, information or demands from users can be responded to and dealt with quickly (i.e. measures transmitted to the manufacturing process and put into practice).

Additionally, by recording the names of the operators and the times of the operations in the manufacturing process on the database, labor can be managed using the same means.

Moreover, using the first bar code 20 as a keyword, it is possible to make a print out in tabular form selecting only the necessary parameters. The bar code is used as the keyword, however, a transponder or the like, capable of identifying rubber products is included.

What is claimed is:

1. A method for controlling rubber products using identification marking comprising the steps of: manufacturing rubber products using a variety of materials including a plurality of rubber materials, shipping said rubber products with a first identification marking given thereto, and controlling manufacturing information, sales information, and distribution information at the point of manufacture based on said first identification marking, wherein necessary information is output after being selected on the basis of said first identification marking, and at least one of the manufacturing information, the sales information, and the distribution information.

2. A method for controlling rubber products using identification marking as claimed in claim 1, wherein said products are controlled using a database linking together and storing the manufacturing information, sales information, and distribution information based on said first identification marking.

3. A method for controlling rubber products using identification marking as claimed in claim 1, wherein the first identification marking is given during a molding process, and said rubber products are controlled by using the first identification marking together with inspection results recorded from manufacturing process steps from molding to shipping inspection, and including steps of vulcanization and size selection.

4. A method for controlling rubber products using identification marking as claimed in claim 2, wherein the first identification marking is given during a molding process, and said rubber products are controlled by using the first identification marking together with inspection results recorded from manufacturing process steps from molding to shipping inspection, and including steps of vulcanization and size selection.

5. A method for controlling rubber products using identification marking as claimed in claim 3, wherein a second identification marking is given to each of the rubber materials constituting the rubber product during a manufacturing process prior to molding, and the products are controlled by relating the first identification marking to the second identification marking.

6. A method for controlling rubber products using identification marking as claimed in claim 4, wherein a second identification marking is given to each of the rubber materials constituting the rubber product during a manufacturing process prior to molding, and the products are controlled by relating the first identification marking to the second identification marking.

7. A method for controlling rubber products using identification marking as claimed in claim 1, comprising the steps of: forming renewable rubber products by replacing a portion of the rubber material of returned rubber products; understanding the record of said rubber products from the first identification marking given to the returned rubber products at the time of renewing said rubber products, and indicating a renewal process program with optimal conditions to the manufacturing process based on the understood record; shipping the renewed rubber product with a third identification marking given; and controlling the manufacturing information, sales information, and distribution information at the point of manufacture according to said first and third identification markings.

8. A method for controlling rubber products using identification marking as claimed in claim 3, comprising the steps of: forming renewable rubber products by replacing a portion of the rubber material of returned rubber products; understanding the record of said rubber products from the first identification marking given to the returned rubber products at the time of renewing said rubber products, and indicating a renewal process program with optimal conditions to the manufacturing process based on the understood record; shipping the renewed rubber product with a third identification marking given; and controlling the manufacturing information, sales information, and distribution information at the point of manufacture according to said first and third identification marking.

9. A method for controlling rubber products using identification marking as claimed in claim 5, comprising the steps of: forming renewable rubber products by replacing a portion of the rubber material of returned rubber products; understanding the record of said rubber products from the first identification marking given to the returned rubber products at the time of renewing said rubber products, and indicating a renewal process program with optimal conditions to the manufacturing process based on the understood record; shipping the renewed rubber product with a third identification marking given; and controlling the manufacturing information, sales information, and distribution information at the point of manufacture according to said first and third identification marking.

10. A method for controlling rubber products using identification marking as claimed in claim 1, wherein if said rubber product is a returned rubber product which can be renewed by replacing a portion of the rubber material, then a judgment is made, based on said first identification marking as well as manufacturing information, as to whether or not a shipped rubber product is nearing its renewal time, and if it is judged that the shipped rubber product is nearing its renewal time then sales staff are informed that the shipped rubber product is nearing its renewal time.

11. A method for controlling rubber products using identification marking as claimed in claim 3, wherein if said rubber product is a returned rubber product which can be renewed by replacing a portion of the rubber material, then a judgment is made, based on said first identification marking as well as manufacturing information, as to whether or not a shipped rubber product is nearing its renewal time, and if it is judged that the shipped rubber product is nearing its renewal time then sales staff are informed that the shipped rubber product is nearing its renewal time.

12. A method for controlling rubber products using identification marking as claimed in claim 5, wherein if said rubber product is a returned rubber product which can be renewed by replacing a portion of the rubber material, then a judgment is made, based on said first identification marking as well as manufacturing information, as to whether or not a shipped rubber product is nearing its renewal time, and if it is judged that the shipped rubber product is nearing its renewal time then sales staff are informed that the shipped rubber product is nearing its renewal time.

13. A method for controlling rubber products using identification marking as claimed in claim 7, wherein a judgment is made, based on said first identification marking and manufacturing information, as to whether or not a shipped rubber product is nearing its renewal time, and if it is judged that the shipped rubber product is nearing its renewal time then sales staff are informed that the shipped rubber product is nearing its renewal time.

14. A method for controlling rubber products using identification marking as claimed in claim 3, wherein necessary information is output after being selected on the basis of said first identification marking, and the record of said inspection results.

15. A method for controlling rubber products using identification marking as claimed in claim 5, wherein necessary information is output after being selected on the basis of at least one of said first identification marking and said second identification marking, and at least one of the manufacturing information, the sales information, the distribution information, and the rubber material.

16. A method for controlling rubber products using identification marking as claimed in claim 7, wherein necessary information is output after being selected on the basis of at least one of said first identification marking and said third identification marking, and at least one of the manufacturing information, the sales information, and the distribution information.

17. A method for controlling rubber products using identification marking as claimed in claim 1, wherein the first identification marking is given to a rubber product by giving to said rubber product a label with said first identification marking given thereto.

18. A method for controlling rubber products using identification marking as claimed in claim 1, wherein said rubber products are vehicle tires.

19. A method for controlling rubber products using identification marking as claimed in claim 7, wherein said rubber products are aircraft tires.

* * * * *